United States Patent [19]
Heikel

[11] Patent Number: 4,759,916
[45] Date of Patent: Jul. 26, 1988

[54] PROCESS FOR PREPARING A PIGMENTARY TITANIUM DIOXIDE

[75] Inventor: Henrik R. Heikel, Midland, Mich.

[73] Assignee: The Dow Chemical Company, Midland, Mich.

[21] Appl. No.: 821,507

[22] Filed: Jan. 21, 1986

Related U.S. Application Data

[63] Continuation of Ser. No. 484,106, Apr. 11, 1983, abandoned.

[51] Int. Cl.$^4$ .................... C01G 23/047; C01G 23/053
[52] U.S. Cl. ......................................... 423/71; 423/82; 423/84; 423/610
[58] Field of Search .................. 423/71, 82, 84, 85, 423/610; 75/101 R, 114, 121

[56] References Cited

U.S. PATENT DOCUMENTS

| | | | |
|---|---|---|---|
| 1,106,406 | 8/1914 | Rossi et al. | 423/81 |
| 1,166,547 | 1/1916 | Rossi et al. | 423/71 |
| 1,911,396 | 5/1933 | Saklatwalla et al. | 423/71 |
| 1,932,087 | 10/1933 | Eichter | 423/71 |
| 2,182,420 | 12/1939 | Allan et al. | 423/84 |
| 2,531,926 | 11/1950 | Todd et al. | 423/84 |
| 2,941,863 | 6/1960 | Wainer | 423/71 |
| 3,067,010 | 12/1962 | Long et al. | 74/15 |
| 3,112,178 | 11/1963 | Judd | 423/80 |
| 3,329,484 | 7/1967 | Long et al. | 423/611 |
| 3,342,424 | 9/1967 | Whately et al. | 241/21 |
| 3,526,477 | 9/1970 | Wan | 423/69 |
| 3,549,322 | 12/1970 | Klein et al. | 423/83 |
| 3,647,414 | 3/1972 | Nilsen | 75/101 R |
| 3,825,419 | 7/1974 | Chen | 75/121 |
| 3,862,297 | 1/1975 | Claridge et al. | 423/615 |
| 3,903,239 | 9/1975 | Berkovich | 75/101 R |
| 4,019,898 | 4/1977 | Chen et al. | 75/101 R |
| 4,038,363 | 7/1977 | Jarish | 423/82 |
| 4,288,417 | 9/1981 | Rahm et al. | 423/83 |

FOREIGN PATENT DOCUMENTS

| 714857 | 9/1954 | United Kingdom | 423/71 |
|---|---|---|---|

OTHER PUBLICATIONS

"Upgrading of Titanium Slag by Soda and Roasting and Sulphuric Acid Leaching" M. Guegvin & B. Jarish, The Metallurgical Society of CIM Annual Volume, 1978, pp. 114–116.
"Titania from Intermediates Prepared by Soda-Smelting Ilmenite"-A. E. Raddatz et al., Bureau of Mines Report of Investigations 8347, 1979.
"Mobile Facility Synthetic Rutile Plant Dedication-Kerr-McGee Chemical Corporation 2-11-1977.
Chemical Engineers' Handbook, 5th Ed. Robert H. Perry, Cecil H. Chilton, 1973, McGraw Hill Book Co., pp. 3-64, 21-41.
General College Chemistry, Joseph A. Babor and Alexander Lehrman, Thomas Y. Crowell Co. 1940, p. 66.
Chemical Engineering Techniques, B. E. Lauer and Russell F. Heckman Reinhold Publishing Corp. 1952, pp. 301 and 304.
Handbook of Chemistry and Physics 62nd ed. Ed. Robert C. Weast, Melvin J. Astle, 1981, CRC Press, Inc., p. D-12.
Chemistry, John C. Bailor, Jr. et al., Academic Press, 1978, pp. 419–420.
Metals Reference Book, vol. II, Smithells, Butterworths Scientific Publications, 1955, p. 964.
Kirk-Othmer Encyclopedia of Chemical Technology, John Wiley & Sons, vol. 15, pp. 495-499 (1968), vol. 20, pp. 351-352, 392-406 (1969).

*Primary Examiner*—John Doll
*Assistant Examiner*—Jeffrey Edwin Russel

[57] ABSTRACT

A process for preparing pigmentary titanium dioxide by grinding and mixing a titanium-bearing material, such as sorelslag, with an alkali metal compound such as sodium hydroxide, and roasting the mixture. The roasted material is ground followed by washing and filtering. Thereafter, the solid residue is digested with hydrochloric acid. After removing the acid by filtration and washing the solid residue, the residue is calcined to provide a titanium dioxide pigment.

28 Claims, 1 Drawing Sheet

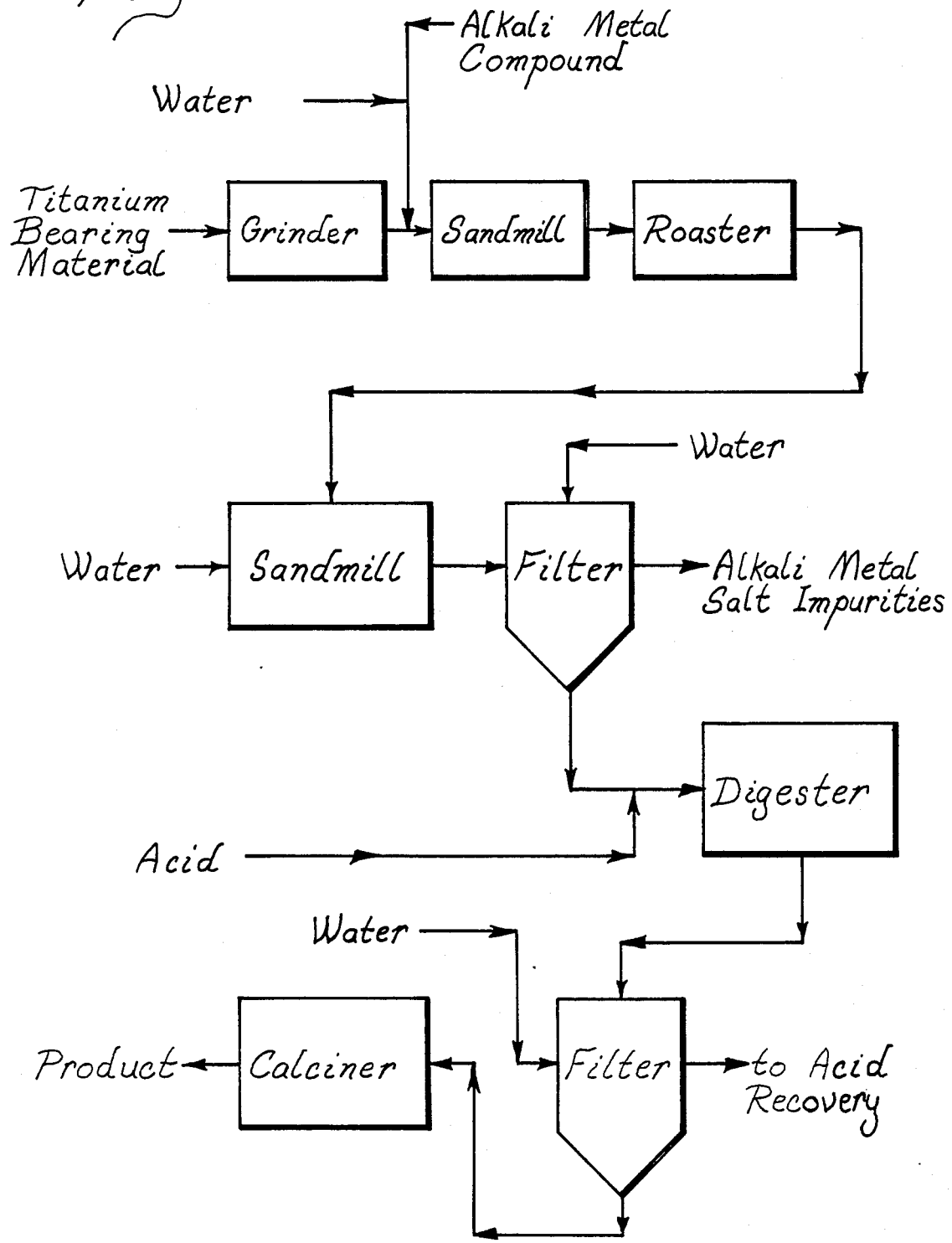

PROCESS FOR PREPARING A PIGMENTARY TITANIUM DIOXIDE

This is a continuation of application Ser. No. 484,106 filed Apr. 11, 1983 now abandoned.

This invention relates to the preparation of titanium dioxide and more particularly to a process for preparing pigmentary titanium dioxide from titanium-bearing materials.

Titanium dioxide ($TiO_2$) is a well known opacifying pigment useful in paint and coating compositions, in plastic materials and as a filler in paper and other materials. Various known processes for producing $TiO_2$ include, for example, the processes commonly referred to as the "sulphate" process and the "chloride" process. The "sulphate" process involves solubilizing the titanium values in low grade titanium ores, such as ilmenite or sorelslag, with concentrated sulfuric acid and meticulously removing ferrous sulfate formed in the process. This is followed by precipitation, washing and calcining to form pigmentary $TiO_2$. The "chloride" process, on the other hand, involves volatilizing, as tetrahalide, the titanium values in high grade titanium ores, such as Australian rutile (containing about 95 percent $TiO_2$) or highly beneficiated ilmenite. This is followed by purification and oxidation. These processes are very complex and capital intensive which accounts for the relatively costly product of $TiO_2$ pigment.

It is desired to provide a simplified process for preparing a $TiO_2$ pigment whereby the titanium values in titanium-bearing materials or ores are not solubilized or converted to a vaporizable liquid compound, but are separated, through solid-liquid reactions, from the ore's impurities and mechanically comminuted to pigmentary size.

SUMMARY OF THE INVENTION

The present invention is directed to a process for preparing titanium dioxide comprising the following steps: (a) contacting a titanium-bearing material with an alkali metal compound selected from the group consisting of an alkali metal hydroxide, an alkali metal carbonate or an alkali metal oxide, (b) roasting the material of step (a) above, (c) digesting the roasted material in an acid, and (d) calcining the digested material.

BRIEF DESCRIPTION OF DRAWING

FIG. 1 is a schematic flow diagram of one manner in which the process of the present invention can be carried out.

DETAILED DESCRIPTION OF THE INVENTION

The starting material for the process of the present invention is a titanium-bearing material, for example, sorelslag.

Various grades of sorelslag may be used in the present process. For example, the composition of one typical grade of sorelslag, expressed as oxides, may consist of approximately 70 weight percent (wt. %) $TiO_2$, and approximately 11 wt. % FeO as an impurity with the remainder being impurities including, for example, CaO, MgO, $SiO_2$, $Al_2O$, MnO, $V_2O_5$, $Cr_2O_3$ and other oxides as trace impurities. Another grade of solelslag useful in the present process may consist of approximately 78 wt. % $TiO_2$, approximately 8 wt. % FeO as an impurity, and the remainder impurities such as those listed above.

It is to be understood that the present invention is not limited to sorelslag. Other titanium-bearing materials or ores as starting materials for the present invention are within the scope thereof. For example, another titanium-bearing slag referred to as "chloride slag" may be used in the process of the present invention.

A typical chloride slag may consist of approximately 85 wt. % $TiO_2$, approximately 10 wt. % FeO as an impurity and the remainder impurities such as those listed above.

Another suitable raw material for the process of the present invention can be an intermediate product formed during a beneficiation process of ilmenite such as that described in U.S. Pat. No. 3,825,419.

A typical raw material formed during the benefiication process above may consist of approximately 95 wt. % $TiO_2$, approximately 1 wt. % FeO as an impurity and the remainder impurities such as those listed above.

Examples of other titanium-bearing materials which can be used in the process according to the present invention are any titanium-bearing material which is so treated that the titanium dioxide portion thereof becomes reactive with an alkali metal compound when heated at about 700° to about 950° C. An alkali metal compound, as used herein, includes, for example, an alkali metal hydroxide, an alkali metal carbonate, or an alkali metal oxide or mixtures thereof when heated at about 700° to about 950° C.

All of the equipment used in the process of the present invention for grinding, mixing, roasting, filtering and calcining and all other operations are carried out by conventional equipment suitable for the purpose of continuous or batch type operation. For comminuting the titanium-bearing starting material to micron size it is preferred to use "sandmills" of the type described and illustrated, for example, in U.S. Pat. No. 2,581,414. A "sandmilling" process will refer herein to a process of grinding a material to micron particle size using the type of equipment described and illustrated, for example, in U.S. Pat. No. 2,581,414. However, the grinding media used in such equipment is not limited to sand, but can be glass, steel, ceramic, or any other suitable grinding media having or spherical or bead shape, generally, in the range of about 0.5 to about 3 millimeters in diameter.

The digesting step has to be carried out in vessels with inner surface portions or linings resistant, under normal operating conditions, to the acid utilized in the process. Suitable materials for such resistant surface portions are, for example, glass, FRP (glass fiber reinforced plastic), polyester, vinylester, epoxy, other suitable plastics, Hasteloy (Ni/Mo alloy), rubber, refractory metals (Ta, Zr, Cb) or acid resistant brick.

According to a preferred embodiment of the present invention, the size of the titanium-bearing material should be small enough for all or substantially all of the material to react with an alkali metal compound. With reference to FIG. 1, the titanium-bearing starting material is first ground, for example, by hammermilling to a size suitable for sandmilling. Hereinafter the process of the preferred embodiment will be described with reference to sorelslag as the titanium-bearing material but, as aforementioned, the material is not limited to sorelslag. The sorelslag is then sandmilled to an average particle size of about 10 micron or smaller. Particles larger than about 10 micron may occlude impurities which may not be readily removed from the starting material in the subsequent process steps of the present invention. The sorelslag is then intimately mixed with an alkali metal compound as described above. Alkali metals such as sodium, potassium, lithium, rubidium, or cesium or mixtures thereof may be used. The preferred compound is an alkali metal hydroxide and more preferably sodium hydroxide because it is readily reactive with the finely ground material. Hereinafter, the process of the present invention will be described with reference to sodium hydroxide as the alkali metal compound but is not limited thereto.

Sodium hydroxide may be mixed with the sorelslag material prior to roasting and preferably during the sandmilling step above or, alternatively, prior to sandmilling. The mixture of sorelslag and sodium hydroxide can contain about 30 parts by weight or above of sodium hydroxide to about 100 parts by weight of sorelslag. Preferably, about 30 to about 60 parts of sodium hydroxide to about 100 parts of sorelslag is used. More preferably, the ratio of sorelslag to sodium hydroxide is about 100:35 to about 100:45. Using a ratio of sorelslag to sodium hydroxide above or below the range of about 100:30 to about 100:60 is operable, however, it may result in an unsatisfactory product. When a material bearing a higher $TiO_2$ content is used, the hydroxide portion of the mixture is increased accordingly.

The mixture of sorelslag and sodium hydroxide is heated or roasted at temperatures ranging from about 700° to about 950° C. for a length of time ranging from about 1 to about 3 hours. At roasting temperatures above about 950° C. a hard material or clinker may result, and below about 700° C. the reaction between the sodium hydroxide and sorelslag may not be complete. It is, therefore, preferred to roast the mixture at about 800 to about 870° C. for about 1½ to about 2 hours. Preferably, the roasted mixture is subsequently ground to about 0.5 to about 2 microns, because, as mentioned above, fine particles will enhance the removal of impurities from the product during the subsequent treatments.

During the roasting step, it is believed that the $TiO_2$ contained in the mixture reacts with the sodium hydroxide forming a sodium titanate. Some of the impurities in the material may also react with the particular hydroxide used to form an alkali metal salt, leaving them in an extractable form. For example, when sodium hydroxide is used, the impurities in their alkali metal salt form include sodium vanadate, sodium chromate, sodium aluminate and sodium silicate, which are readily soluble in water. These impurities are therefore preferably at least partially dissolved in water by washing, after the roasting step, to reduce, or more preferably, substantially entirely remove deleterious amounts of the impurity from the product. Other compounds present in the starting material such as iron oxide, magnesium oxide, and calcium oxide are soluble in mineral acids, such as hydrochloric acid (HCl). These compounds are removed from the product in the digestion step as discussed below. After the water soluble impurities are washed off or dissolved from the roasted material, the remaining insoluble alkali metal titanate and residue is digested in hydrochloric acid. It is preferred to use about 6 normal (N) HCl acid because a much weaker acid is not as effective as about 6 N. A stronger acid may be effectively used in a pressurized container but tends to approach 6 N when boiled in a vessel open to the atmosphere.

At standard atmospheric pressure, the digestion step can be carried out at about 80° C. or above. At standard atmospheric pressure, the digestion step is preferably carried out under reflux; for example, at about 90° to about 110° C., and preferably at about 108° C., for a length of time ranging from about 10 to about 120 minutes, preferably at about 10 to about 40 minutes. Higher temperatures can be used, however, pressurized equipment may be necessary. The digestion step above may be carried out one or more times, however, it is preferred to carry out the digestion step at least two times. During the digestion step, the alkali metal titanate formed is believed to hydrolyze into amorphous hydrous $TiO_2.nH_2O$ and the iron oxides solubilize as ferrous and ferric chloride. The iron chlorides and other impurities in the acid suspension are removed by, for example, centrifugation or filtration and, optionally, disposed of or further treated to recover unreacted acid. The insoluble amorphous titanium dioxide residue is washed with a fluid such as water to further remove soluble impurities. Thereafter, the $TiO_2$ is recovered from the water by, for example, filtering or centrifuging. A white residual cake results after this step is carried out.

The amorphous $TiO_2$ is calcined, preferably, for about 30 to about 60 minutes at temperatures ranging from about 800° to about 1000° C. to convert the $TiO_2$ to its crystalline rutile form. More preferably, a temperature of about 875° to about 925° C. for about 30 minutes to about one hour is employed, because undesirable discoloration of the resulting pigment is minimized and lower temperatures are not as effective in converting the product into its desirable crystalline form.

If the crystalline rutile product, which is preferably acicular in shape, obtained after calcination is severely agglomerated it may be pulverized or sandmilled to a particle size of about 0.05 to about 0.3 micron in thickness and about 0.1 to about 1.0 micron in length. Preferably an acicular shaped $TiO_2$ particle has a particle size of about 0.2 micron in thickness and about 0.7 micron in length, because the light scattering ability of the pigment and, consequently, its value as an opacifier is dictated by a narrow optimum size range. The acicular crystal habit is believed to stem from needle shaped sodium titanate crystals.

This product can be used as a pigment in any of the typical applications for which opacifying pigments are used. As an illustration only and not to limit the scope of the the present invention, the $TiO_2$ pigment obtained from the process of the present invention can be used as an opacifier in paint, paper or plastics. The opacifying power and brightness of the product is determined by measuring its light scattering coefficient and reflectance. Pigment obtained by the process of this invention desirably has a light scattering coefficient of about 4000 $cm^2/g$ to about 9000 $cm^2/g$, a brightness of about 88 percent to about 93 percent and an iron content of about 30 ppm to about 520 ppm when measured in accordance to the method described under Example 1, below.

The following examples illustrate the present invention.

EXAMPLE 1

A 600 gram (g) sample of hammermilled sorelslag ore with approximately 70 wt. % $TiO_2$ and approximately 30 wt. % impurities (about 200 U.S. Standard mesh) was dispersed in 450 ml of water. The sorelslag in water suspension was sandmilled with 800 milliliters (ml) of 1.5 millimeters (mm) diameter steelshot for 120 minutes (min.) at 1000 revolutions per minute (rpm). The sandmill used was a vertical water-cooled laboratory sandmill constructed of stainless steel having a cylindrical grinding vessel with an inside diameter of 11.5 centimeters (cm) and a height of 19 cm; a shaft, driven by an air turbine, and two 8.5 cm diameter polyurethane disc impellers 4 cm apart. The peripheral velocity of the impellers was 4.4 meters per second (m/s). Speed was controlled with an optical tachometer. At completion of the sandmilling, the top size of the sorelslag particles was about 10 microns ($\mu$m), the average size being about 5 $\mu$m. After the steelshot was removed from the slag suspension by screening through a 40 mesh screen, 240 g of anhydrous sodium hydroxide (NaOH) was added to the slag suspension and then thoroughly mixed. The mixture, having a sorelslag/NaOH ratio of 100/40, was then evaporated to dryness in air in a shallow dish at 120° Centigrade (°C.). To break up any agglomerates formed after drying and obtain a homogeneous mixture, the dried material was hammermilled using a Weber Brothers Lab Mill S-500. The resulting fine powder was roasted in air in porcelain crucibles for 2 hours (hrs) at 820° C. A 150 g sample of the roasted material was pulverized in a mortar to remove any lumps formed after roasting and dispersed in 350 ml water. The roasted material and water was sandmilled with 700 ml of 1.2 mm diameter glass beads for 30 minutes at 1000 rpm. Glass beads were used in this sandmilling step instead of steelshot to avoid discoloration of the material caused by steelshot.

After removing the beads by screening, the sandmilled roasted material and water dispersion was centrifuged. The solid residue formed after centrifugation (solids) was washed by redispersing in water and recentrifuging. The washing was repeated twice.

The solids were then dispersed in 1000 ml 6N HCl acid and boiled at about 108° C. in an open beaker while agitating with a magnetic stirrer for 90 minutes. The acidic liquor containing the solids was centrifuged. The solids were washed with water twice and dried in air at 120° C. The dried solids were then calcined for 1 hour at 900° C.

The density of the resulting white calcined product was 4.14 g/cm$^3$ and X-ray diffraction analysis showed the calcined product had a rutile structure. Electron transmission microscopy revealed pigmentary grade TiO$_2$ particles with an acicular shape. The particle size of the acicular pigment ranged from about 0.05 to about 0.3 $\mu$m thick and about 0.1 to about 1.0 $\mu$m long.

The brightness (R$\infty$) of the pigment was 88.4 percent based on the measurement of light reflectance of a fumed magnesium oxide surface having a 100% reflectance, and its scattering coefficient (S) was 6,835 square centimeters per gram (cm$^2$/g). The iron (Fe) content of the pigment was determined by X-ray fluorescence, and found to be 520 parts per million (ppm).

DETERMINING SCATTERING COEFFICIENT (S) AND BRIGHTNESS (R$\infty$)

The primary function of a TiO$_2$ pigment is to provide opacity to a material, such as paint, paper, plastics, etc., in which it is incorporated as a uniform dispersion. Of the many modes used for expressing a pigment's opacifying power, the term scattering coefficient is particularly meaningful and can be easily determined accurately and reproducibly.

The principle of this test is to make a thin film of the pigment over a black plate glass so that the film is slightly translucent, i.e., has a reflectance of about 80–90 percent of that of the reflectance of a thick completely opaque film. Another film of same dispersion is applied on a white glass plate and made so thick that a further increase in thickness does not change its light reflectance. When the reflectances of these two films (R and R$\infty$, respectively) are measured and the weight (W) of the film coating over the back plate is determined (weight of dry film per unit area, g/cm$^2$), the scattering coefficient S (cm$^2$/g) can be calculated using the Kubelka-Munk Theory of light scattering (Zeits. fur Tech. Physik, 12, 593, 1931). The reflectance measurement of the film over the white glass, R$\infty$, is often referred to as brightness. Tables, based on Kubelka-Munk equations are found in an article by Mitton-Jacobsen, "New Graphs for Computing Scattering Coefficient and Hiding Power", Official Digest, September, 1963, pages 871–913. Using the tables of the above ariticle, S can be easily computed knowing R, R$\infty$ and W. Example A, below, further illustrates a method of determining S.

Example A

A pigment is dispersed in water and a small amount of binder is added which as a film former makes a coherent film when the dispersion is cast on glass plates for reflectance measurements. Since the opacity of the film is very sensitive to the volume ratio of pigment to binder, this ratio must be kept accurately constant and at high enough level at which the opacifying power of the pigment is not appreciably depressed by the presence of binder. Tests are run at pigment volume concentration (pvc) of 70.00 percent (pigment's volume=70.00 percent of total solids volume and total solids volume=pigment volume+binder volume) and at low enough solids content so that the film, when cast with a 1.5 mil applicator on black glass will be slightly translucent (having a reflectance of about 80–90 percent of that of the reflectance of a thick, completely opaque film of same dispersion). A solids volume of about 4 percent is a suitable level for TiO$_2$ dispersions (pigment volume+binder volume=4 percent of total volume of dispersion). An example of a film composition with TiO$_2$ pigment for testing S and R$\infty$ is described in Table A below.

TABLE A

| | Grams Weight | g/ml Density | ml Volume of Solids | ml Volume of Dispersion |
|---|---|---|---|---|
| TiO$_2$ pigment sample | 15.00 | 4.20 | 3.57 | 3.57 |
| dispersant[1] | 0.50 | 1.00 | | 0.50 |
| binder (50.1% solids by weight)[2] | 3.06 | 1.04 | 1.53 | 3.11 |
| Water | 120.32 | 1.00 | | 120.32 |
| | 138.88 | | 5.10 | 127.50 |

[1] An anionic polyacrylate dispersant, sold under the trade name "Nalco ® 2324"
[2] A carboxylated styrene-butadiene latex sold under the trade name "Dow Latex 620" by The Dow Chemical Company.

In the above composition the pvc=70.00 percent and solids volume of dispersion solids=4.00 percent.

The pigment, water and dispersant is mixed for 5 minutes with a homogenizer sold under the trade name "Polytron" by Brinkmann Instruments Company, at speed setting 4. Then Dow Latex 620 is added and mixture is stirred at speed setting 2 for 5 minutes.

A Bird Film Applicator, commercially available from Gardner Laboratory, a Division of Pacific Scientific Company, having a width of 6 inches and a gap of 0.0015 inch (=1.5 mils) is placed on the top edge of an 8×8 inch black glass plate (reflectance=0) and about 3 ml of th dispersion is put in front of the applicator. The applicator is drawn down on glass plate uniformly with an even speed. The film is allowed to dry at room temperature in a horizontal position. Using a Bird applicator with a gap of 3 mils, the same dispersion is drawn down on a white glass plate (reflectance=85.6).

After the films are allowed to dry for about 2 hours, a 2.00×2.50 inch rectangular template, having an area of 5.00 square inches ($in^2$) or 32.26 square centimeters ($cm^2$), is placed over the film on the black plate and the coating outside the template is removed with a razor blade leaving a 5 $in^2$ rectangular patch on the black plate. Next, using a Photovolt reflectometer equipped with an external digital voltmeter and a search unit with a blue optical glass filter sold under the trade name Wratten filter by Eastman Kodak Company, the reflectances of the patch on the black plate and the coating on the white plate are measured. Next, the patch on the black glass is removed with a razor blade and weighed on an analytical balance.

The following values represent an example:
R=79.5
$R\infty$=92.0
W=0.0186 gram/5 $in^2$ or 0.000577 $g/cm^2$
From Table 8, on page 895 of the article by Mitton-Jacobsen above, and given the above values for R and $R\infty$ the scattering power (SW) is found to equal 4.09. The scattering coefficient (S) can then be calculated as follows:

$$S = \frac{SW}{W} = \frac{4.09}{0.000577 \text{ g/cm}^2} = 7088 \text{ cm}^2/\text{g}$$

EXAMPLE 2

A 600 g sample of sorelslag with approximately 70 wt. % $TiO_2$ and approximately 30 wt. % impurities was sandmilled as in Example 1. The steelshot-ground suspension contained 57 percent slag. 175 g of this suspension (=100 g solid slag) was mixed with 67 g anhydrous $Na_2CO_3$, dried, hammermilled and roasted for 2 hours at 1050° C. The hard, roasted material was broken into about ⅛ inch bits in mortar and then hammermilled into fine powder which was further sandmilled with glass beads as in Example 1.

The roasted material was dispersed in water and separated centrifugally and washed as in Example 1, and digested in 1000 ml 6N HCl for 90 minutes, followed by solids separation and washing as in Example 1. After calcining for 1 hour at 900° C., a white pigment having a rutile structure and a density of 4.10 $g/cm^3$ was obtained. The pigment had a brightness of 78.3 percent and an S of 4,128 $cm^2/g$.

EXAMPLE 3

A 600 g sample of hammermilled sorelslag with approximately 70 wt. % $TiO_2$ and approximately 30 wt. % impurities was sandmilled with steelshot as in Example 1. The screened steelshot was washed with water. The wash water was combined with ground slag suspension. With the added water the suspension had a solids content of 45.9 percent.

A 327 g sample of the slag suspension (=150 g solid slag) was mixed with 52.5 g anhydrous NaOH resulting in a slag/NaOH ratio of 100:35. The mixture was evaporated to dryness at 120° C., followed by hammermilling and then roasting for 2 hours at 800° C. Without further sandmilling, the roasted material was dispersed in water and centrifuged. The solids formed after centrifuging were washed with water twice by redispersing in water and recentrifuging. The washed roasted material was then boiled for one hour in 1000 ml 6N HCl in open beaker. The solids formed after digestion were separated from the acid liquor were separated and washed centrifugally two times. The solids were then redispersed in 300 ml water and sandmilled with 700 ml glass beads for 60 minutes at 1000 rpm. After the glass beads were screened out, the white, opaque suspension was mixed with an equal volume of 12N HCl and boiled for 10 minutes in an open beaker (the final boiling point being about 108° C.). The solids were then separated and washed twice with water and dried at 120° C. The solids were then calcined for 1 hour at 900° C. A pigmentary $TiO_2$ having a density of 4.0 $g/cm^3$ and an iron content of 150 ppm was obtained. The pigment had a brightness of 88.9 percent and an S of 3,760 $cm^2/g$.

EXAMPLE 4

A 327 g sample of steelshot-ground sorelslag suspension prepared in Example 3 (=150 g solid slag) was mixed with 45 g anhydrous NaOH (the slag/NaOH ratio=100/30). The mixture was evaporated to dryness at 120° C., followed by hammermilling and roasting as in Example 3. The two digestion steps and other processing steps were also performed as in Example 3. This example was carried out to determine the affect of reducing the amount of NaOH added to the sorelslag material of Example 3 on final pigment properties.

After calcination, the pigmentary $TiO_2$ obtained was buff in color and had an iron content of 8300 ppm. The pigment had a brightness of about 50 percent. The value of S was not determined.

EXAMPLE 5

A 600 g sample of hammermilled sorelslag with approximately 70 wt. % $TiO_2$ and approximately 30 wt. % impurities was dispersed in 480 g 50 percent NaOH solution (the slag/NaOH ratio=100/40). The suspension was sandmilled for 150 minutes at 900 rpm with 800 ml steelshot with the sandmill described in Example 1. The sandmilled suspension had solid particles up to about 13 $\mu$m in size with the average size being about 7 $\mu$m.

After the steelshot was screened from the suspension, the suspension was dried at 120° C., hammermilled and roasted for 2 hours at 850° C.

A 150 g sample of the roasted material was sandmilled with 700 ml glass beads and 350 ml water at 1000 rpm for 10 minutes. After the glass beads were screened out, the solids were separated centrifugally and washed twice. The solids residue formed after centrifugation was then dispersed in 500 ml of 10.8N HCl and boiled with reflux at 107° C. for 25 minutes. The solids were separated from the acid liquor centrifugally and washed once with water. The centrifuged solids were redispersed in 500 ml 7N HCl and boiled with reflux at 108° C. for 30 minutes. The solids were separated from the acid liquor centrifugally and washed three times. The centrifuged solids were dried at 120° C. and calcined for 45 minutes at 900° C. A pigmentary $TiO_2$ was obtained with an iron content of 65 ppm. The pigment had a brightness of 90.5 percent and an S of 4,472 cm$^2$/g.

EXAMPLE 6

A 400 g sample of hammermilled sorelslag with approximately 70 wt. % TiO$_2$ and approximately 30 wt. % impurities was dispersed in 280 ml water and 180 g anhydrous NaOH (the slag/NaOH ratio=100/45). The suspension was sandmilled for 150 minutes at 1350 rpm with 600 ml of 1.5 mm steelshot with the sandmill described in Example 1.

After screening out the steelshot, the sandmilled suspension was dried at 120° C., hammermilled and roasted for 2 hours at 840° C. A 150 g sample of roasted material was dispersed in 350 ml water and sandmilled with 700 ml of 1.2 mm diameter glass beads for 10 minutes at 1000 rpm. After screening, the glass beads, the suspension was centrifuged and washed twice. The washed centrifuge cake weighed 234 g and contained 96 g water. Thus, the yield of solid roasted material was 138 g. This cake was dispersed in 300 ml water and 605 ml 12N HCl. The liquid portion resulted in a 7.3N HCl which after neutralization of solids became 6N. Digestion with reflux at 108° C. lasted 20 minutes. The solids were separated fro the acid liquor centrifugally and washed twice, then redispersed in 600 ml 6N HCl and digested another 20 minutes, followed by centrifugal solids separation and 2 washings. The solids were then dried at 120° C. and calcined for 1 hour at 900° C. A TiO$_2$ pigment was produced with an iron content of 30 ppm. The pigment had a brightness of 90.1 percent and an S of 6,170 cm$^2$/g.

EXAMPLE 7

In this example, the sorelslag/NaOH ratio was changed to 100/50 and processed as follows.

A 600 g sample of hammermilled sorelslag with approximately 70 wt. % TiO$_2$ and approximately 30 wt. % impurities was dispersed in 400 ml of water and sandmilled with 800 ml of 1.5 mm steelshot for 120 minutes at 1800 rpm with the sandmill described in Example 1. The steelshot was removed by screening.

Into 200 grams of this slag suspension, containing 120 g sorelslag, 60 g of anhydrous NaOH was solubilized and dried in a shallow dish in an oven at 120° C. The dried material was hammermilled and roasted for 2 hours at 840° C. The roasted material was dispersed in 350 ml of water and sandmilled with 700 ml of 1.2 mm diameter glass beads for 10 minutes at 1000 rpm. After screening the glass beads, the sandmilled roasted material was vacuum filtered in a 15 cm diameter Buchner funnel with a filter paper having a pore size of about 7 microns made by W&R Bolton, Ltd., England, and sold under the trade name Whatman filter paper No. 541 and washed with about 2 liters of water. The washed roasted material was then digested with reflux in 1000 ml 6N HCl at 108° C. for 20 minutes. Then 7 g of a 1 percent solution of a first flocculating agent was added. The first flocculating agent added was a cationic homopolymer manufactured by The Dow Chemical Company of the type generally described in U.S. Pat. No. 3,719,748. The flocculated suspension was vacuum filtered and washed on the filter with 2 liters of water. The filter cake was dispersed in 1000 ml 6N HCl and boiled 20 minutes at 108° C. Then 1000 ml of cold water and 7 g of a 1 percent solution of a second flocculating agent was added. The second flocculating agent, also manufactured by The Dow Chemical Company, was a slightly anionic homopolymer of acrylamide in solid form with a degree of hydrolysis of about 1 to 5 percent. Viscosity of a 0.5 percent solids in water solution at a pH of 3 and 25° C. of the second flocculating agent was in the range of about 31–50 centipoise (cp). The flocculated suspension was vacuum filtered and washed with 2 liters of water followed by drying at 120° C. The solids were calcined for 1 hour at 900° C.

A pigmentary TiO$_2$ was obtained having an S of 2408 cm$^2$/g and brightness of 83.9 percent. It is believed that the high NaOH content led to poor optical properties. Electronmicrographs revealed a nodular or non-acicular shaped pigment. An X-ray diffraction analysis confirmed that the pigment had a rutile structure.

EXAMPLE 8

In this example, a titanium-bearing material, referred to as "chloride slag" with approximately 85 wt. % TiO$_2$ and approximately 15 wt. % impurities was used to produce a pigmentary TiO$_2$. This material, in granular form, had a particle size of about 20 U.S. Standard Mesh.

A 400 g sample of this material was mixed with 200 g anhydrous NaOH and 300 ml water. The mixture was sandmilled, using the sandmill described in Example 1, with 700 ml of 1.5 mm steelshot at 1500 rpm for 240 minutes to an average particle size below about 10 μm. After the steelshot was screened from the sandmilled suspension, the suspension was dried at 120° C., hammermilled and roasted for 2 hours at 840° C.

A 150 g sample of the roasted material was dispersed in 350 ml of water and sandmilled at 1000 rpm with 700 ml glass beads for 10 minutes. The glass beads were screened out from the suspension and then the suspension was centrifuged. The centrifuge cake was washed 4 times. The centrifuged cake was digested in 1000 ml of 6N HCl for 20 minutes with reflux at 108° C. At the end of the digestion, 5 g of a 1 percent solution of the first flocculating agent described in Example 7, was added to the digested material and the flocculated suspension was vacuum filtered. The filter cake was then washed on the filter with 1000 ml water. The washed filter cake was digested a second time in 1000 ml of 6N HCl for 20 minutes with reflux at 108° C. After digestion, 5 g of a 1 percent solution of the second flocculating agent described in Example 7, was added to the digested material. The flocculated suspension was then vaccum filtered and washed with 2 liters of water on the filter. The filter cake was then dried at 120° C. The solids were calcined for 1 hour at 900° C. A pigmentary TiO$_2$ was obtained having an S of 5,670 cm$^2$/g and a brightness of 89.0 percent.

EXAMPLE 9

A 500 g sample of hammermilled sorelslag with approximately 78 wt. % TiO$_2$ and approximately 22 wt. % impurities was dispersed in 350 ml water and sandmilled for 180 minutes at 1800 rpm with 800 ml of 1.5 mm steelshot with the sandmill described in Example 1. The peripheral velocity of impellers was 8 m/s.

The ground slag was screened through a 40 mesh screen to remove the steelshot. The steelshot was rinsed with water and the rinse water was combined into the slag grind resulting in a slag suspension having a solids content of 24.5 percent.

Into 612 g of this slag suspension (=150 g solid slag), 67.5 g anhydrous NaOH was added giving a sorelslag/NaOH ratio of 100/45. The mixture was evaporated to dryness at 120° C. in a shallow dish. The dried material was hammermilled to obtain a homogeneous fine powder. The powder was then heated or roasted in a porcelain crucible for 150 minutes at 840° C. Upon cooling, the roasted material was pulverized in a mortar. The roasted material was then dispersed in 350 ml of water and sandmilled for 10 minutes at 1800 rpm in the laboratory sandmill above using 700 ml of 1.2 mm diameter glass beads as grinding media. The sandmilled roasted material was screened free of beads, diluted to 1500 ml with water and vacuum-filtered through a 15 cm diameter Buchner funnel using #541 Whatman paper. The filter cake, being about 2 cm thick was washed on the filter with about 2 liters of water. Solids content of the filter cake was 62.6 percent.

The washed filter cake was dispersed in 300 ml of water plus 200 ml 12N HCl. The mixture having a normality of about 4.4 was put into a 2 liter 4-necked glass flask equipped with a reflux condenser, a thermometer, an agitator and a funnel with a stopcock. The dispersion was heated up to a temperature of 100° C. Thereafter, 400 ml 12N HCl was added into the flask. The temperature dropped momentarily to 85° C., however, within 5 minutes the temperature reached 108° C., the boiling point of 6N HCl. The mixture was boiled for 20 minutes. The mixture was then diluted with cold water to 2000 ml. Under continued agitation, 7 g of a 1 percent solution of the first flocculating agent, described in Example 7, was added to the mixture.

The mixture now being about 3N was vacuum filtered. The filter cake was washed on the filter with 2 liters of water. Solids content of the filter cake was 32.5 percent.

The filter cake, weighing 323 g (solids=105 g), was dispersed in a solution containing 280 ml of water plus 200 ml of 12N HCl. This mixture was placed in the 4-necked glass flask and heated to 100° C. Thereafter 300 ml of 12N HCl was added to the mixture. The temperature was raised to 108° C. boiling point of 6N HCl and kept at this temperature for 20 minutes. The mixture was diluted to 2000 ml with cold water. Under continued agitation, 7 g of a 1 percent solution of the second flocculating agent described in Example 7, was added to the mixture. The mixture was filtered and washed the same as after the first digestion.

The filter cake, about 3 cm thick, was dried at 120° C., and thereafter ground in a mortar. The ground cake was calcined for 1 hour at 900° C. The calcined material was immediately placed in a large shallow porcelain dish and cooled at room temperature exposed to air. A pigmentary $TiO_2$ was obtained.

An X-ray diffraction analysis identified the pigment as rutile which had a density of 4.1 g/cm$^3$. The pigment had an S of 6,900 cm$^2$/g and a brightness of 92.2 percent.

EXAMPLE 10

A $TiO_2$ pigment was produced as in Example 9, except that the sorelslag/NaOH ratio was changed to 100/40 and the NaOH was added to the sorelslag prior to sandmilling rather than after the slag was sandmilled.

The pigment had an S of 8,900 cm$^2$/g and a brightness of 91.0 percent.

EXAMPLE 11

A titanium-bearing material made during the Benilite Cyclic Process from ilmenite by reduction roasting and subsequent HCl acid leaching was used as starting material in this example. This black material had approximately 95 wt. % $TiO_2$ and approximately 5 wt. % impurities and a particle size of about 60 U.S. Standard mesh.

A 400 g sample of the material was mixed with 200 g NaOH, and 350 ml $H_2O$ and sandmilled with the sandmill described in Example 1 with 600 ml of 1.5 mm steelshot for 90 minutes at 1600 rpm. The sandmilled material contained particles with an average size of below about 10 µm. After the steelshot was screened out, the ground material was dried at 120° C., hammermilled and roasted for 2 hours at 840° C. A 170 g sample of roasted material was dispersed in 350 ml of water and sandmilled with 700 ml of glass beads at 1600 rpm for 10 minutes. After the beads were screened out, the suspension was centrifuged and the centrifuged cake was washed 2 times with water.

The centrifuged cake was digested with reflux in 1000 ml 6N HCl for 20 minutes. The solids were separated from the acid liquor and washed centrifugally. A second digestion also in 1000 ml 6N HCl was carried out followed by centrifugal separation and washing. The solids were dried at 120° C. and then calcined for 1 hour at 900° C. An acicular shaped, pigmentary $TiO_2$ was obtained. The pigment had an S of 4,260 cm$^2$/g and a brightness of 90.0 percent.

Table I, below, summarizes the examples above excluding Examples 2, 8 and 11.

TABLE I

| Example No. | Ratio of Slag/NaOH | Steelshot grind (rpm/minutes) | NaOH present during initial grind? | Number of digestions | Iron content (ppm) | S (cm$^2$/g) | Brightness (percent) |
|---|---|---|---|---|---|---|---|
| 1 | 100/40 | 1000/120 | No | 1 | 520 | 6,835 | 88.4 |
| 3 | 100/35 | 1000/120 | No | 2 | 150 | 3,760 | 88.9 |
| 4 | 100/30 | 1000/120 | No | 2 | 8300 | — | 50.0 |
| 5 | 100/40 | 900/150 | Yes | 2 | 65 | 4,472 | 90.5 |
| 6 | 100/45 | 1350/150 | Yes | 2 | 30 | 6,170 | 90.1 |
| 7 | 100/50 | 1800/120 | No | 2 | — | 2,408 | 83.9 |
| 9 | 100/45 | 1800/180 | No | 2 | — | 6,900 | 92.2 |
| 10 | 100/40 | 1800/180 | Yes | 2 | — | 8,900 | 91.0 |

What is claimed is:

1. A process for preparing a titanium dioxide pigment comprising the steps of:
   (a) comminuting a titanium dioxide-bearing material selected from the group consisting of sorelslag, beneficiated ilmenite and chloride slag to a particle size of about 10 microns or less;
   (b) mixing the titanium dioxide-bearing material with an alkali metal compound selected from the group consisting of an alkali metal hydroxide, an alkali metal carbonate, and an alkali metal oxide;

(c) roasting the mixture at about 700° C. to about 900° C.;

(d) digesting the roasted material in hydrochloric acid at about 90° C. to about 110° C. such that a suspension of a solid product in the acid is formed; and (e) calcining at least the solid product at a temperature ranging from about 800° C. to about 1000° C. to form a titanium dioxide pigment.

2. The process of claim 1 wherein the titanium dioxide-bearing material is sorelslag.

3. The process of claim 2 wherein the alkali metal hydroxide is sodium hydroxide.

4. The process of claim 3 wherein in step (b) the sorelslag is mixed with the sodium hydroxide in a ratio by weight of about 100:30 to about 100:60.

5. The process of claim 1 including the step of micronizing the calcined product to below about 0.3 micron.

6. The process of claim 1 wherein the digesting step is carried out at least two times.

7. A process for preparing a titanium dioxide pigment comprising the steps of:
(a) sandmilling a mixture of titanium dioxide-bearing material selected from the group consisting of sorelslag, beneficiated ilmenite and chloride slag, and an alkali metal compound selected from the group consisting of an alkali metal hydroxide, an alkali metal carbonate or an alkali metal oxide in water to a particle size of about 10 microns or less;
(b) roasting the mixture at about 700° C. to about 900° C.;
(c) sandmilling the roasted mixture in water;
(d) digesting the roasted mixture in hydrochloric acid at about 90° C. to about 110° C. to form a titanium dioxide material; and
(e) calcining the titanium dioxide material at a temperature ranging from about 800° C. to about 1000° C. to form a titanium dioxide pigment.

8. The process of claim 7 wherein the titanium dioxide-bearing material is sorelslag.

9. The process of claim 8 wherein the alkali metal hydroxide is sodium hydroxide.

10. The process of claim 9 wherein in step (b) the sorelslag is mixed with the sodium hydroxide in a ratio by weight of about 100:30 to about 100:60.

11. The process of claim 7 including the step of micronizing the calcined product to below about 0.3 micron.

12. The process of claim 7 wherein the digesting step is carried out at least two times.

13. A process for preparing a titanium dioxide pigment comprising the steps of:
(a) sandmilling a mixture of titanium dioxide-bearing material selected from the group consisting of sorelslag, beneficiated ilmenite and chloride slag, and an alkali metal compound selected from the group consisting of an alkali metal hydroxide, an alkali metal carbonate or an alkali metal oxide in water to a particle size of about 10 microns or less;
(b) roasting the mixture at about 700° C. to about 900° C.;
(c) sandmilling the roasted mixture in water;
(d) filtering solubilized material from the roasted mixture;
(e) digesting the roasted mixture in hydrochloric acid at about 90° C. to about 110° C. to form a titanium dioxide material;
(f) filtering the titanium dioxide material from the acid; and
(g) calcining the titanium dioxide material at a temperature ranging from about 800° C. to about 1000° C. to form a titanium dioxide pigment.

14. The process of claim 13 wherein the titanium dioxide-bearing material is sorelslag.

15. The process of claim 14 wherein the alkali metal hydroxide is sodium hydroxide.

16. The process of claim 15 wherein in step (b) the sorelslag is mixed with the sodium hydroxide in a ratio by weight of about 100:30 to about 100:60.

17. The process of claim 13 including the step of micronizing the calcined product to below about 0.3 micron.

18. The process of claim 13 wherein the digesting step is carried out at least two times.

19. A process for preparing a titanium dioxide pigment comprising the steps of:
(a) comminuting a titanium dioxide-bearing material selected from the group consisting of sorelslag, beneficiated ilmenite and chloride slag to a particle size of about 10 microns or less;
(b) mixing the titanium dioxide-bearing material with an alkali metal compound selected from the group consisting of an alkali metal hydroxide, an alkali metal carbonate or an alkali metal oxide;
(c) roasting the mixture at about 700° C. to about 900° C.;
(d) sandmilling the roasted mixture in water;
(e) filtering solubilized material from the roasted mixture;
(f) digesting the roasted mixture in hydrochloric acid at about 90° C. to about 110° C. to form a titanium dioxide material;
(g) filtering the titanium dioxide material from the acid;
(h) washing the titanium dioxide material; and
(i) calcining the titanium dioxide material at a temperature ranging from about 800° C. to about 1000° C. to form a titanium dioxide pigment.

20. The process of claim 19 wherein the titanium dioxide-bearing material is sorelslag.

21. The process of claim 20 wherein the alkali metal hydroxide is sodium hydroxide.

22. The process of claim 21 wherein in step (b) the sorelslag is mixed with the sodium hydroxide in a ratio by weight of about 100:30 to about 100:60.

23. The process of claim 19 including the step of micronizing the calcined product to below about 0.3 micron.

24. The process of claim 19 wherein the digesting step is carried out at least two times.

25. The process of claims 1, 7, 13 or 19 wherein the digesting is carried out in about 10 to about 120 minutes.

26. The process of claims 1, 7, 13 or 19 wherein the titanium dioxide pigment produced after calcination has a brightness ($R_\infty$) of about 88 percent to about 93 percent.

27. The process of claims 1, 7, 13 or 19 wherein the titanium dioxide pigment produced after calcination has a scattering coefficient (S) of about 4000 $cm^2/g$ to about 9000 $cm^2/g$.

28. The process of claims 1, 7, 13 or 19 wherein the titanium dioxide pigment produced after calcination has an iron content of about 30 ppm to about 520 ppm.

* * * * *

UNITED STATES PATENT AND TRADEMARK OFFICE
CERTIFICATE OF CORRECTION

PATENT NO. : 4,759,916
DATED : July 26, 1988
INVENTOR(S) : Henrik R. Heikel It is certified that error appears in the above-identified patent and that said Letters Patent is hereby corrected as shown below:

Column 2, lines 17 and 18, "benefiication should read --beneficiation--.

Column 2, line 21, the word "Example" should be indented.

Column 6, beneath TABLE A, insert --1.-- before "An anionic" and insert --by Nalco Chemical Company -- at the end of this sentence.

Column 7, line 6, "ml of th" should read --ml of the--.

Column 9, line 25, "separated fro" should read --separated from--.

Signed and Sealed this

Tenth Day of October, 1989

Attest:

DONALD J. QUIGG

Attesting Officer

Commissioner of Patents and Trademarks